(12) United States Patent
Kang

(10) Patent No.: US 7,398,178 B2
(45) Date of Patent: Jul. 8, 2008

(54) METHOD OF DETERMINING THE IRREGULARITIES OF A HOLE

(75) Inventor: Hyo-Cheon Kang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 258 days.

(21) Appl. No.: 10/954,254

(22) Filed: Sep. 29, 2004

(65) Prior Publication Data

US 2005/0090999 A1 Apr. 28, 2005

(30) Foreign Application Priority Data

Oct. 27, 2003 (KR) ............ 10-2003-0074960

(51) Int. Cl.
*G01B 5/28* (2006.01)
(52) U.S. Cl. .............. 702/155; 702/35; 702/81
(58) Field of Classification Search ............ 702/81–84, 702/150, 151, 155–157, 33–36, 127, 158, 702/159, 166, 167; 33/1 SP, 555.1, 1 BB, 33/121, 123, 542, 543; 700/303, 58, 111; 356/492, 495, 496, 511, 625, 628, 629
See application file for complete search history.

(56) References Cited

U.S. PATENT DOCUMENTS 6,277,661 B1 8/2001 Yang et al.
6,724,947 B1 * 4/2004 Hayes ............... 382/286
2005/0197801 A1 * 9/2005 Wilson .............. 702/155

FOREIGN PATENT DOCUMENTS

JP 2000174077 6/2000
KR 990080533 A 11/1999

OTHER PUBLICATIONS

English Language Abstract of Korean Publication No. 990080533 A.
English Language Abstract of Japanees Publication No. JP2000174077.

* cited by examiner

*Primary Examiner*—Manuel L. Barbee
(74) *Attorney, Agent, or Firm*—Marger Johnson & McCollom, P.C.

(57) ABSTRACT

In a method of calculating irregularities of a hole, a center coordinate of an actual hole is set. Inner wall coordinates of the actual hole are obtained from the center coordinate of the actual hole. An area of the actual hole is determined based on the inner wall coordinates of the actual hole. A radius of a virtual hole is determined based on the area of the actual hole. A center coordinate of the virtual hole is determined based on the inner wall coordinates of the actual hole to obtain a circumference line of the virtual hole. A standard deviation of the inner wall coordinates of the actual hole relative to the circumference line of the virtual hole is calculated, thereby obtaining the irregularities of the actual hole.

19 Claims, 5 Drawing Sheets

METHOD OF DETERMINING THE IRREGULARITIES OF A HOLE

CROSS REFERENCE TO RELATED APPLICATION

This application claims priority under 35 USC § 119 to Korean Patent Application No. 2003-74960, filed on Oct. 27, 2003, the contents of which are herein incorporated by reference in its entirety for all purposes.

BACKGROUND OF THE INVENTION

1. Field of the Invention

The present invention relates to a method of determining the irregularities of a hole, for example, a hole in a semiconductor device. More particularly, the present invention relates to a method of determining the irregularities of a hole, for example, a contact hole or a via hole, used for providing electrical connection between layers of a semiconductor device.

2. Description of the Related Arts

Generally, a semiconductor device includes an impurity region of a transistor and a metal layer of a capacitor. An insulation layer is interposed between the impurity region and the metal layer to provide insulation therebetween. To electrically connect the impurity region with the metal layer, or the metal layers with each other, a contact hole or a via hole is formed through the insulation layer. The contact hole or the via hole is filled with a conductive material to electrically connect the impurity region with the metal layer, or the metal layers with each other.

The contact hole and the via hole generally have a cylindrical shape. Thus, the contact hole and the via hole have a circular cross-sectional shape. The size of the contact hole or the via hole is determined in accordance with the design rule of the semiconductor device. As the semiconductor device has been highly integrated, the size of the contact hole or the via hole have become small. This causes difficulty in accurately forming the contact hole or the via hole according to a designed dimension. As a result, it is required to determine whether the size of the contact hole or the via hole is within the design dimension. Accordingly, a process for determining the contact hole or the via hole having an accurately circular shape is needed in semiconductor fabrication processes.

In one conventional method of inspecting the failure of a contact hole, a reference image is set in the inspection equipment. The reference image is compared to an image of the contact hole.

In another conventional method, the inspection region having a contact hole is magnified. An inspection point is set in various directions in the inspection region. The contact hole is inspected based on the inspection point.

In still another conventional method, a scanning electron microscope (SEM) provides image data with respect to a region having a contact hole are read. The image data with respect to a feature of the contact hole are identified. A first parameter related to the image data is computed. The first parameter is compared with predetermined values. The particular feature of the contact hole is then classified in accordance with the comparison result.

However, since the failure of the contact hole is determined using the reference image, the determined result varies according to the reference image employed. When the reference image does not have a precise shape, reliability of determining the accuracy of the contact hole may be reduced. In particular, the reference image is greatly influenced by a striation of a pattern formed on a wafer and the size of the pattern, thereby further reducing the reliability of accurately determining the failure of the contact hole.

SUMMARY OF THE INVENTION

The present invention provides a method of calculating a irregularities of a hole capable of accurately determining a failure of a hole such as a contact hole.

In a method of calculating irregularities of a hole in accordance with one aspect of the present invention, a center coordinate of an actual hole is set. Inner wall coordinates of the actual hole are obtained from the center coordinate of the actual hole. An area of the actual hole is calculated based on the inner wall coordinates of the actual hole. A radius of a virtual hole is calculated based on the area of the actual hole. A center coordinate of the virtual hole is calculated based on the inner wall coordinates of the actual hole to obtain a circumference line of the virtual hole. A standard deviation of the inner wall coordinates of the actual hole relative to the circumference line of the virtual hole is calculated, thereby obtaining the irregularities of the actual hole.

According to the present invention, the standard deviation of the distance from the center of the virtual hole to the inner wall coordinates of the actual hole relative to the radius of the virtual hole is calculated so that the irregularities of the hole is precisely calculated.

BRIEF DESCRIPTION OF THE DRAWINGS

The above objects and advantages of the present invention will become more apparent by describing preferred embodiments in detail with reference to the attached drawings in which.

DESCRIPTION OF THE EMBODIMENTS

Hereinafter, a method of determining the irregularities of a hole is illustrated in detail.

Figure 1:
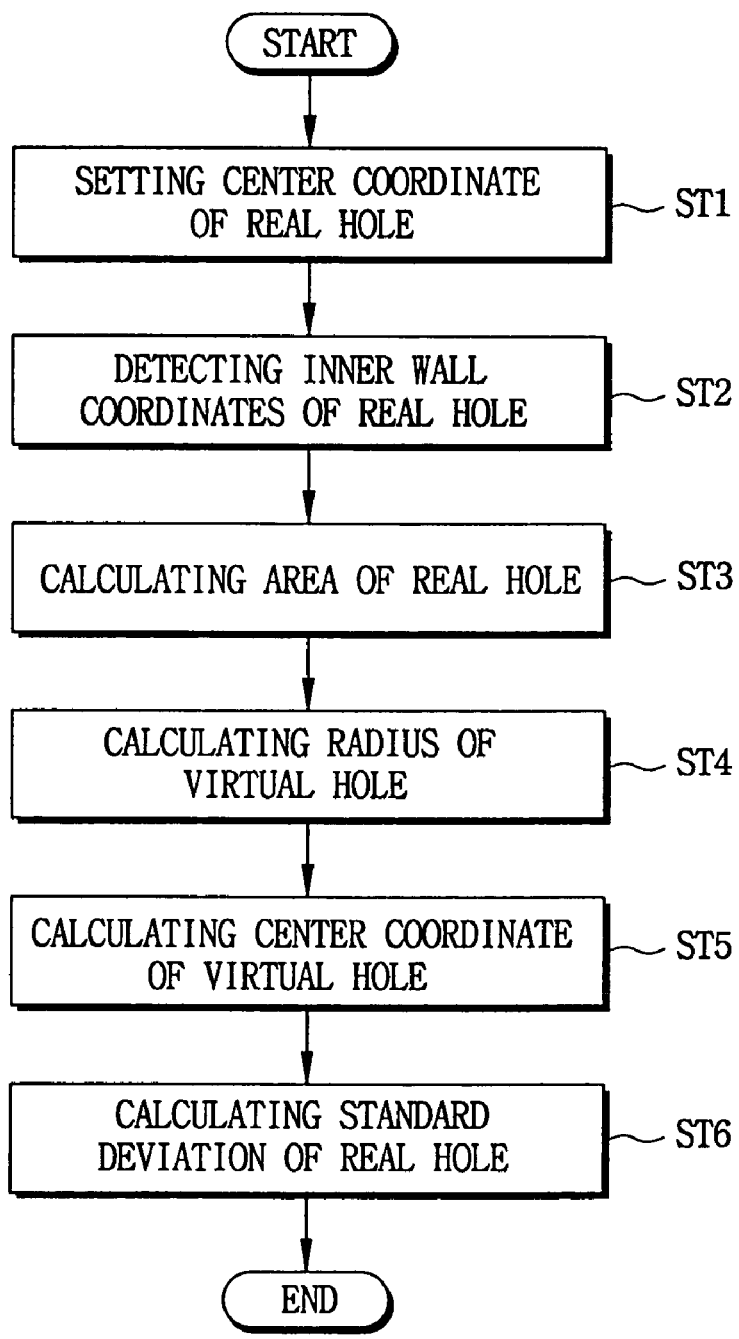
FIG. 1 is a flow chart illustrating a method of determining the irregularities of a hole of a semiconductor in accordance with one embodiment of the present invention.

Referring to FIG. 1, in step ST1, an X-Y coordinate system is set on an actual hole, for example, a contact hole or a via hole. A center coordinate of the actual hole is set on the X-Y coordinate system.

In step ST2, n points (here, n is a positive integer) are arbitrarily set on an inner wall of the actual hole. Intervals between the points are substantially equal with each other. Coordinates of the n points on the X-Y coordinate system is obtained. Here, the coordinates of the n points correspond to inner wall coordinates of the actual hole.

In step ST3, an entire area of the actual hole is determined. The entire area of the actual hole may be determined by the following method. Lines are drawn from the center coordinate of the actual hole to the inner wall coordinates of the actual hole, respectively, so that the actual hole is divided into n triangles. The n triangles are summed to obtain the entire area of the actual hole.

In step ST4, a radius of a virtual hole is determined using the entire area of the actual hole. Here, the virtual hole represents an ideal circular-shaped hole without an irregular circumferential configuration. Accordingly, the radius of the virtual hole is substantially equal to that of a designed hole.

In step ST5, a sum of the inner wall coordinates is divided by n to obtain a center coordinate of the virtual hole.

In step ST6, distances from the center coordinate of the virtual hole to the inner wall coordinates of the actual hole are determined. A standard deviation of the radius of the actual hole relative to the determined distances is ascertained. Here, the standard deviation represents differences between the inner wall coordinates of the actual hole and the circumference of the virtual hole. Accordingly, the determined standard deviation corresponds to a irregularities of the actual hole.

Hereinafter, the method of determining the irregularities of the actual hole is illustrated in more detail with reference to the accompanying drawings.

Figure 2:
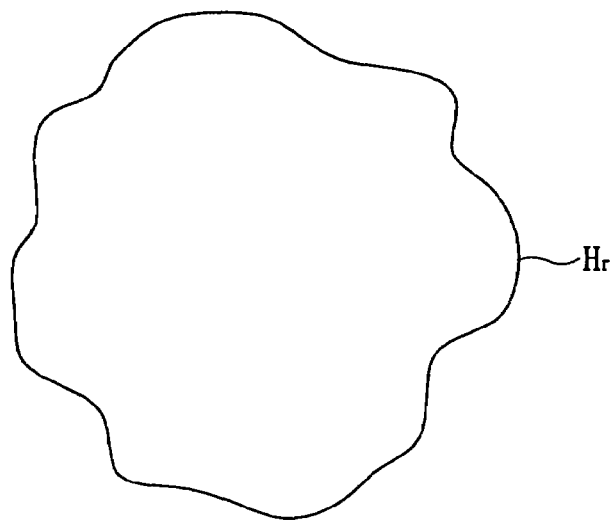
FIG. 2 is a plan view illustrating an actual hole.

FIG. 2 is a plan view illustrating an actual hole. With reference to FIG. 2, a actual hole Hr may correspond to a contact hole or a via hole formed through an insulating layer of a semiconductor device. Although the designed shape of the actual hole Hr is a circle, the actual hole Hr may have an irregular circumference due to a processing error. For example, when the actual hole Hr is the contact hole, the contact hole may have the irregular circumference due to a failed mask pattern or a failed etching process.

Figure 3:
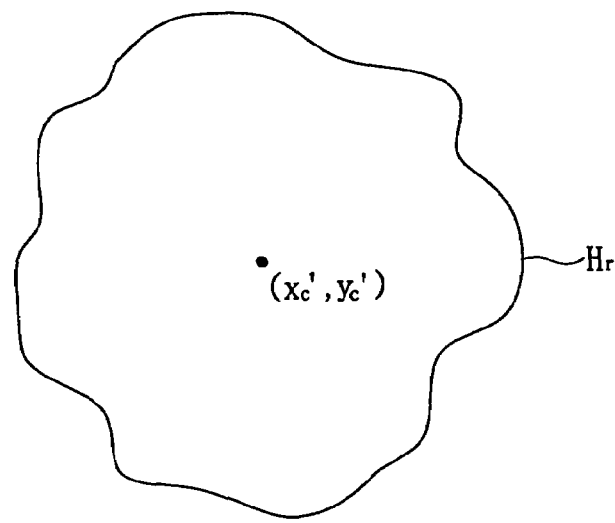
FIG. 3 is a plan view illustrating the actual hole in FIG. 2 on which a center coordinate is set.

FIG. 3 is a plan view illustrating the actual hole in FIG. 2 on which a center coordinate is set. With reference to FIG. 3, an arbitrary center coordinate (xc',yc') is set on the actual hole Hr.

Figure 4:
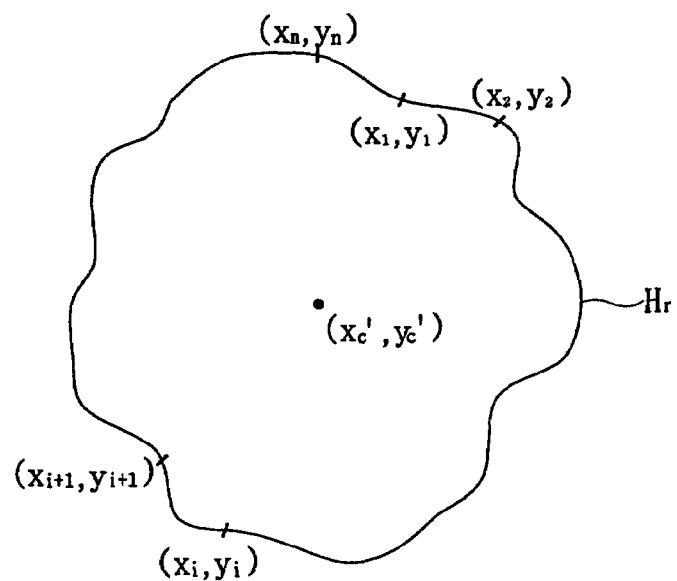
FIG. 4 is a plan view illustrating the actual hole in FIG. 3 on which inner wall coordinates are set.

FIG. 4 is a plan view illustrating the actual hole in FIG. 3 on which inner wall coordinates are set. With reference to FIG. 4, n inner wall coordinates $(x_1,y_1)$, $(x_2,y_2)$, $(x_3,y_3)$, ..., $(x_i,y_i)$, ..., $(x_n,y_n)$ of the actual hole Hr, wherein n is a positive integer, are set on the irregular circumference of the actual hole Hr. The inner wall coordinates of the actual hole Hr may be obtained by scanning the actual hole Hr from the center coordinate $(x_c',y_c')$ of the actual hole Hr to the inner wall of the actual hole Hr with an electron beam.

Figure 5:
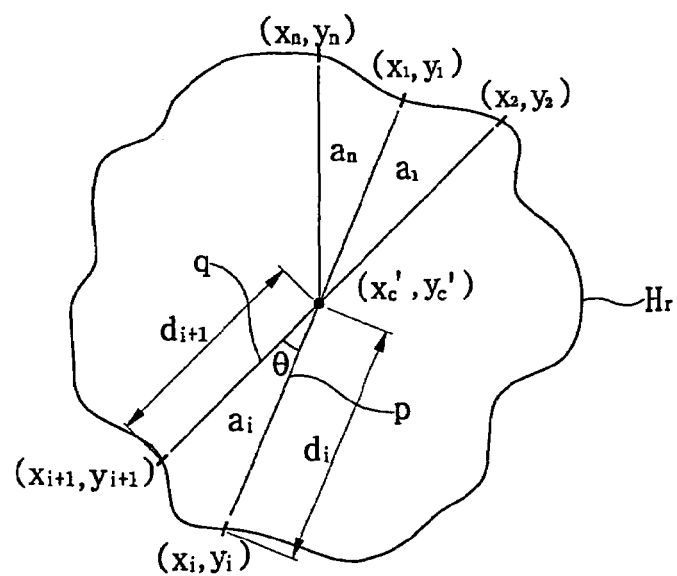
FIG. 5 is a plan view illustrating the actual hole in FIG. 4 that is divided into n regions, wherein n is a positive integer.

FIG. 5 is a plan view illustrating the actual hole in FIG. 4, which is divided into n regions. With reference to FIG. 5, n lines are drawn from the center coordinate $(x_c',y_c')$ of the actual hole Hr to the inner wall coordinates of the actual hole Hr. Thus, the actual hole Hr is divided into n regions $a_1$, $a_2$, $a_3$, ..., $a_i$, ..., $a_n$. Each of the regions has a triangular shape including three vertexes. For example, the region a1 has three vertexes $(x_c',y_c')$, $(x_1,y_1)$, $(x_2,y_2)$. The region an has three vertexes $(x_c',y_c')$, $(x_1,y_1)$, $(x_n,y_n)$.

Each of areas $\Delta a_i$ of the regions is determined using following equation (1).

$$\Delta a_i = \tfrac{1}{2} d_i d_{i+1} \sin\theta \tag{1}$$

In equation 1, $d_i$ indicates a length of a line p that is connected between the center coordinate $(x_c',y_c')$ of the actual hole Hr and the i-th inner wall coordinate $(x_i,y_i)$ of the actual hole Hr. $(d_i d_{i+1} \sin\theta)$ indicates a length of a line q that is connected between the center coordinate $(x_c',y_c')$ of the actual hole Hr and the $_{i+1}$-th inner wall coordinate $(x_{i+1}, y_{i+1})$ of the actual hole Hr. θ indicates an angle between the lines p and q. Particularly, a plurality of θ of the inner wall coordinates of the actual hole Hr is substantially equal to each other.

Each of the areas determined using equation (1) is summed using following equation (2) to obtain an area Ar of the actual hole Hr.

$$Ar = \Delta a_1 + \Delta a_2 + \Delta a_3 + \ldots + \Delta a_i + \ldots + \Delta a_n \tag{2}$$

Figure 6:
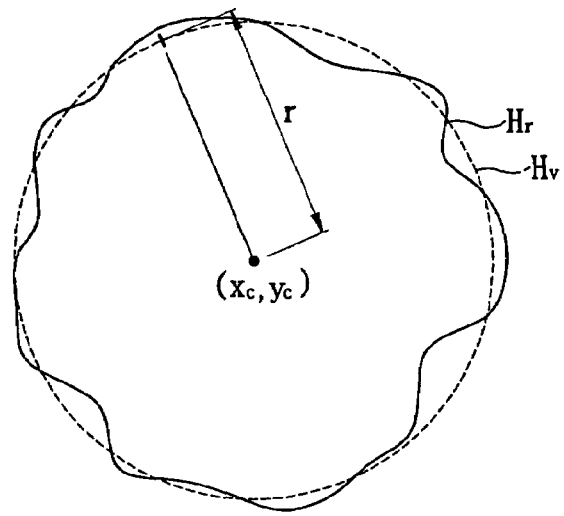
FIG. 6 is a plan view illustrating a virtual circular-shaped hole overlapped on the actual hole in FIG. 2.

FIG. 6 is a plan view illustrating a virtual hole overlapped on the actual hole in FIG. 2. With reference to FIG. 6, a radius r of a virtual hole Hv is determined using following equations (3) and (4).

$$Ar = \tfrac{1}{2}\pi r^2 \tag{3}$$

$$r = \sqrt{\frac{2Ar}{\pi}} \tag{4}$$

A center coordinate $(x_c,y_c)$ of the virtual hole Hv is determined using following equations (5) and (6).

$$x_c = (x_1 + x_2 + x_3 + \ldots + x_i + \ldots + x_n)/n \tag{5}$$

$$y_c = (y_1 + y_2 + y_3 + \ldots + y_i + \ldots + y_n)/n \tag{6}$$

When a circle having the radius r is drawn from the center coordinate $(x_c,y_c)$ of the virtual hole Hv, the drawn circular line is a circumference line of the virtual hole Hv in FIG. 6. Here, the inner wall coordinates of the actual hole Hr are disposed on the circumference line of the virtual hole Hv or are disposed adjacent to the circumference line of the virtual hole Hv.

Figure 7:
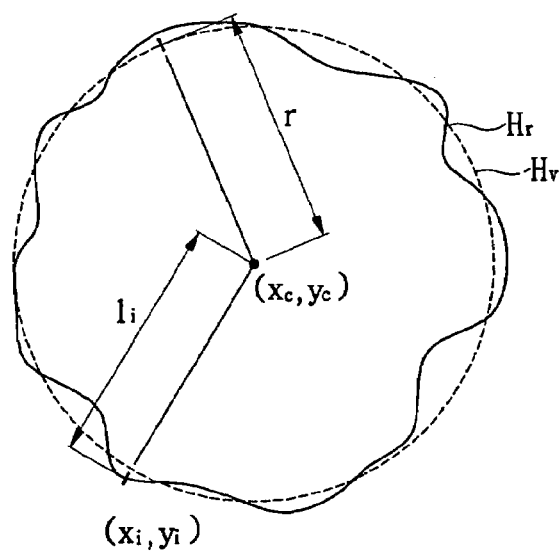
FIG. 7 is a plan view illustrating radii of the virtual circular-shaped hole and the actual hole in FIG. 6.

FIG. 7 is a plan view illustrating radii of the virtual hole and the actual hole in FIG. 6. With reference to FIG. 7, a distance li between the center coordinate $(x_c,y_c)$ of the virtual hole Hv and the i-th inner wall coordinate $(x_i,y_i)$ of the actual hole Hr is determined using following equation (7).

$$l_i = \sqrt{(x_c - x_i)^2 + (y_c - y_i)^2} \tag{7}$$

A standard deviation of the distances $l_1$ relative to the radius r of the virtual hole Hv is determined using following equation (8). Accordingly, the standard deviation σ of the inner wall coordinates of the actual hole Hr relative to the circumference line of the virtual hole Hv is determined using the equation (8).

$$\sigma = \frac{\sqrt{\sum_{i=1}^{n}(l_i - r)^2}}{n} \tag{8}$$

The standard deviation σ corresponds to a irregularities of the actual hole Hr. In particular, the standard deviation σ is a value of a sum total of the distances between the entire inner wall coordinates of the actual hole Hr and the circumference line of the virtual hole Hv divided by n, which represents entire numbers of the inner wall coordinates, so that the value indicates the irregularities of the actual hole Hr.

An algorithm in accordance with the method of the present invention is inputted into inspection equipment for measuring a irregularities of a contact hole, for example an SEM. A critical irregularity of the contact hole determined in designing the contact hole is then set in the inspection equipment. The inspection equipment measures the irregularities of an actual contact hole in accordance with the method of the present invention. The inspection equipment compares the measured irregularities to the critical irregularities to determine a failure of the contact hole.

Figure 8:
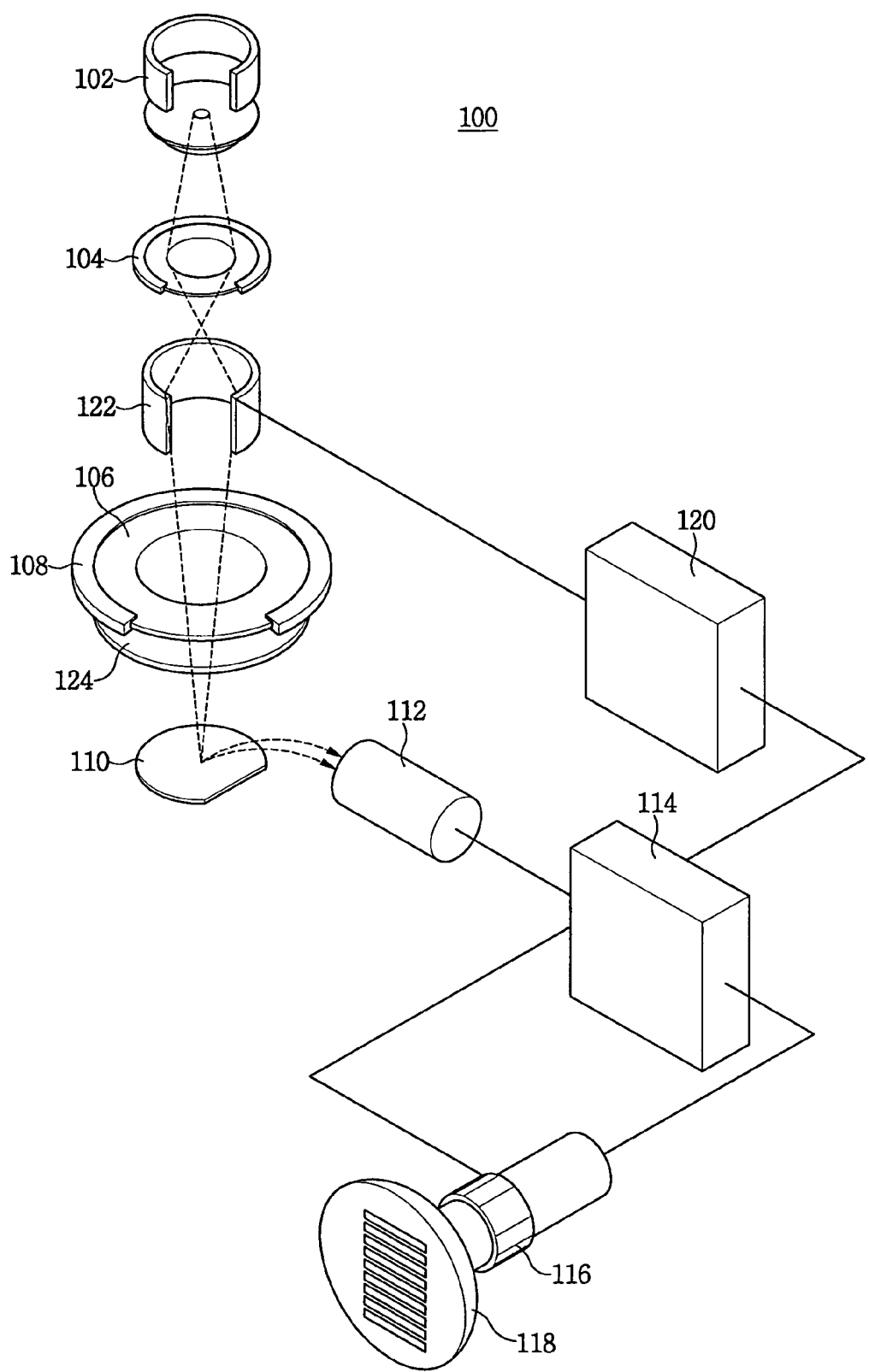
FIG. 8 is an exploded perspective view illustrating an SEM in which a method of the present invention is employed.

FIG. 8 is an exploded perspective view illustrating an SEM in which the method of the present invention is employed.

Referring to FIG. 8, an SEM 100 includes an electron gun 102 for generating an electron beam. The electron gun 102 emits the electron beam through a focusing lens 104. The electron beam is focused through a first deflection coil 122, an object lens 108 and an aperture 106 of a shutter 124. The focused electron beam is irradiated onto a sample 110, for example, a semiconductor substrate.

A signal detector 112 detects secondary electrons emitted from the sample and scattered electrons. The signal detector 112 generates a signal corresponding to the detected electrons. The signal amplifier 114 then amplifies the signal. The amplified signal is transmitted to a fluorescent face of a cathode ray tube 118 to form a visual image of the sample. A second deflection coil controls the amplified signal. The amplified signal is also transmitted to a scanning circuit 120.

Here, although the actual hole is the contact hole or the via hole of the semiconductor device in one embodiment, it is noted that the method of the present invention is not limited to determining the irregularities of the contact hole or the via hole. For example, the method of the present invention may be employed in determining the irregularity of a hole that is formed by piercing machine such as a drilling machine.

According to the present invention, the center coordinate and the radius of the virtual hole are primarily obtained from the actual hole. The irregularities of the actual holes are obtained from the standard deviation of the radius of the actual hole relative to the radius of the virtual hole.

Accordingly, the irregularity of the hole is determined in accordance with the standard deviation so that reliability of the determination is greatly improved.

Having described the preferred embodiment, it is noted that modifications and variations can be made by persons skilled in the art in light of the above teachings. It is therefore to be understood that changes may be made in the particular embodiment of the present invention disclosed which is within the scope and the spirit of the invention outlined by the appended claims.

What is claimed is:

1. An inspection equipment-implemented method of determining irregularities of an actual hole having an irregular circumference, comprising:
    scanning the actual hole having the irregular circumference formed in an object to obtain an area of the actual hole, wherein determining the area of the actual hole comprises setting a center coordinate of the actual hole, obtaining inner wall coordinates of the actual hole measured from the center coordinate of the actual hole, and determining the area of the actual hole based on the inner wall coordinates of the actual hole, and wherein determining the area of the actual hole further comprises drawing lines from the center coordinate of the actual hole to the inner wall coordinates of the actual hole to segment the actual hole into a plurality of triangles;
    determining a radius and a center of a virtual hole that has a regular circumference, based on the area of the actual hole; and
    obtaining the irregularities of the actual hole by determining a standard deviation of the circumference of the actual hole relative to the radius of the virtual hole to output whether the irregularities of the actual hole are within a critical irregularity.

2. The method of claim 1, wherein determining the area of the actual hole comprises:
    providing lines from the center coordinate of the actual hole to the inner wall coordinates of the actual hole to segment the actual hole into a plurality of triangles;
    determining the area of each of the triangles; and
    summing the areas of the triangles.

3. The method of claim 2, wherein angles formed between the lines are substantially identical.

4. The method of claim 1, wherein the actual hole is located in a semiconductor device.

5. The method of claim 1, wherein the radius and the center of the virtual hole that has a regular circumference is calculated based on the area of the actual hole; and
    the irregularities of the actual hole are determined by calculating the standard deviation of the circumference of the actual hole relative to the radius of the virtual hole.

6. The method of claim 1, wherein determining the area of the actual hole comprises calculating the area of the actual hole based on the inner wall coordinates of the actual hole.

7. The method of claim 1, wherein the inspection equipment comprises a scanning electron microscope.

8. An inspection equipment-implemented method of determining irregularities of an actual hole having an irregular circumference located in a semiconductor device, comprising:
    scanning the actual hole in the semiconductor device having the irregular circumference to obtain an area of the actual hole, wherein determining the area of the actual hole in the semiconductor device comprises setting a center coordinate of the actual hole in the semiconductor device, obtaining inner wall coordinates of the actual hole in the semiconductor device measured from the center coordinate of the actual hole, and determining the area of the actual hole in the semiconductor device based on the inner wall coordinates of the actual hole, and wherein determining the area of the actual hole in the semiconductor device further comprises drawing lines from the center coordinate of the actual hole in the semiconductor device to the inner wall coordinates of the actual hole in the semiconductor device to segment the actual hole into a plurality of triangles;
    determining a radius and a center of a virtual hole that has a regular circumference, based on the area of the actual hole in the semiconductor device; and
    obtaining the irregularities of the actual hole in the semiconductor device by determining a standard deviation of the circumference of the actual hole relative to the radius of the virtual hole to output whether the irregularities of the actual hole are within a critical irregularity.

9. The method of claim 8, wherein determining the area of the actual hole in the semiconductor device comprises:
    providing lines from the center coordinate of the actual hole in the semiconductor device to the inner wall coordinates of the actual hole in the semiconductor device to segment the actual hole in the semiconductor device into a plurality of triangles;
    determining the area of each of the triangles; and
    summing the areas of the triangles.

10. The method of claim 9, wherein angles formed between the lines are substantially identical.

11. The method of claim 8, wherein the radius and the center of the virtual hole that has a regular circumference is calculated based on the area of the actual hole in the semiconductor device; and the irregularities of the actual hole in the semiconductor device are determined by calculating the standard deviation of the circumference of the actual hole in the semiconductor device relative to the radius of the virtual hole.

12. The method of claim 8, wherein determining the area of the actual hole in the semiconductor device comprises calculating the area of the actual hole in the semiconductor device based on the inner wall coordinates of the actual hole in the semiconductor device.

13. The method of claim 8, wherein the inspection equipment comprises a scanning electron microscope.

14. An inspection equipment-implemented method of determining irregularities of a hole comprising:

scanning an actual hole formed in an object to set a center coordinate $(x_c', y_c')$ of a actual hole;

obtaining n inner wall coordinates $(x_1, y_1)$, $(x_2, y_2)$, $(x_3, y_3)$, . . . , $(x_i, y_i)$, . . . , $(x_n, y_n)$, wherein n is a positive integer, of the actual hole from the center coordinate of the actual hole;

drawing lines from the center coordinate of the actual hole to the inner wall coordinates of the actual hole to divide the actual hole into triangles, the lines having substantially equal angles between thereof;

summing an area of each of the triangles to obtain an area of the actual hole;

determining a radius r of a virtual hole based on the area of the actual hole;

obtaining a center coordinate $(x_c, y_c)$ of the virtual hole by summing the inner wall coordinates of the actual hole and then dividing the summed inner wall coordinates by n;

determining distances $I_i$ between the center coordinate of the virtual hole and the inner wall coordinates of the actual hole; and obtaining the irregularities of the actual hole, to output whether the irregularities of the actual hole are within a critical irregularity, by determining a standard deviation σ of the distances relative to the radius of the virtual hole using following equation:

$$\sigma = \frac{\sqrt{\sum_{i=1}^{n}(l_i - r)^2}}{n}.$$

15. The method of claim 14, wherein the actual hole is located in a semiconductor device.

16. An inspection equipment-implemented method of determining irregularities of an actual hole having an irregular circumference, comprising:

scanning the actual hole having the irregular circumference formed in an object to obtain an area of the actual hole, wherein determining the area of the actual hole comprises setting a center coordinate of the actual hole, obtaining inner wall coordinates of the actual hole measured from the center coordinate of the actual hole, and determining the area of the actual hole based on the inner wall coordinates of the actual hole, wherein determining the area of the actual hole further comprises providing lines from the center coordinate of the actual hole to the inner wall coordinates of the actual hole to segment the actual hole into a plurality of triangles, determining the area of each of the triangles, and summing the areas of the triangles;

determining a radius and a center of a virtual hole that has a regular circumference, based on the area of the actual hole; and obtaining the irregularities of the actual hole by determining a standard deviation of the circumference of the actual hole relative to the radius of the virtual hole to output whether the irregularities of the actual hole are within a critical irregularity.

17. The method of claim 16, wherein angles formed between the lines are substantially identical.

18. An inspection equipment-implemented method of determining irregularities of an actual hole having an irregular circumference located in a semiconductor device, comprising:

scanning the actual hole in the semiconductor device having the irregular circumference to obtain an area of the actual hole, wherein determining the area of the actual hole in the semiconductor device comprises setting a center coordinate of the actual hole in the semiconductor device, obtaining inner wall coordinates of the actual hole in the semiconductor device measured from the center coordinate of the actual hole, and determining the area of the actual hole in the semiconductor device based on the inner wall coordinates of the actual hole, and wherein determining the area of the actual hole in the semiconductor device further comprises providing lines from the center coordinate of the actual hole in the semiconductor device to the inner wall coordinates of the actual hole in the semiconductor device to segment the actual hole in the semiconductor device into a plurality of triangles, determining the area of each of the triangles, and summing the areas of the triangles;

determining a radius and a center of a virtual hole that has a regular circumference, based on the area of the actual hole in the semiconductor device; and obtaining the irregularities of the actual hole in the semiconductor device by determining a standard deviation of the circumference of the actual hole relative to the radius of the virtual hole to output whether the irregularities of the actual hole are within a critical irregularity.

19. The method of claim 9, wherein angles formed between the lines are substantially identical.

* * * * *